(12) United States Patent
Inagaki

(10) Patent No.: US 7,194,491 B2
(45) Date of Patent: Mar. 20, 2007

(54) DATA BACKUP TECHNIQUE USING NETWORK

(75) Inventor: Takeshi Inagaki, Sagamihara (JP)

(73) Assignee: International Business Machines Corporation, Armonk, NY (US)

(*) Notice: Subject to any disclaimer, the term of this patent is extended or adjusted under 35 U.S.C. 154(b) by 431 days.

(21) Appl. No.: 10/448,536

(22) Filed: May 30, 2003

(65) Prior Publication Data
US 2004/0034672 A1    Feb. 19, 2004

(30) Foreign Application Priority Data
May 30, 2002    (JP)    ............... 2002-158262

(51) Int. Cl.
G06F 17/30    (2006.01)
(52) U.S. Cl. ............ 707/204; 707/200; 707/204; 709/226; 711/162
(58) Field of Classification Search ........... 707/200, 707/202, 204; 709/226
See application file for complete search history.

(56) References Cited

U.S. PATENT DOCUMENTS

| | | | | |
|---|---|---|---|---|
| 6,785,786 | B1* | 8/2004 | Gold et al. ............... | 711/162 |
| 2003/0079018 | A1* | 4/2003 | Lolayekar et al. ......... | 709/226 |
| 2004/0153481 | A1* | 8/2004 | Talluri .................... | 707/200 |
| 2004/0236803 | A1* | 11/2004 | Spiegeleer ............... | 707/204 |
| 2005/0125467 | A1* | 6/2005 | Oosaki et al. ............ | 707/204 |

FOREIGN PATENT DOCUMENTS

| | | |
|---|---|---|
| JP | 07-262067 | 10/1995 |
| JP | 07-334467 | 12/1995 |
| JP | 08-272666 | 10/1996 |
| JP | 10-134485 | 5/1998 |
| JP | 11-053122 | 2/1999 |
| JP | 2000-010868 | 1/2000 |
| JP | 2000-137636 | 5/2000 |
| JP | 2000-155712 | 6/2000 |
| JP | 2001-142653 | 5/2001 |
| JP | 2001-202318 | 7/2001 |
| JP | 2002-044138 | 2/2002 |

* cited by examiner

Primary Examiner—Jeffrey Gaffin
Assistant Examiner—Farhan Syed
(74) Attorney, Agent, or Firm—Timothy N. Ellis

(57) ABSTRACT

A backup management device is provided that efficiently performs a data backup at a remote area by dispersing a load imposed on a network. A backup management device, which transmits data for a backup across a network from a backup source recording device to at least one backup destination recording device, so as to perform the backup of the data, comprises a load calculation means for obtaining a load distribution for the network; a backup destination selector for employing the load distribution to select, from among multiple available backup destinations, at least one backup destination recording device to which data is to be transmitted; and a data transmitter for transmitting the data to at least one backup destination recording device that is selected by the backup destination selector.

19 Claims, 5 Drawing Sheets

DATA BACKUP TECHNIQUE USING NETWORK

BACKGROUND

1. Technical Field

The present invention relates to a data backup technique using a network, and relates in particular to a backup management device for a backup to a remote area across a network, a backup management method and a backup system, a program therefor and a recording medium storing the program.

2. Description of Related Art

Presently, to prevent losses at data centers due to disasters, for example, daily backups to tape media and the transfer of the tape media to remote areas are generally relied on. But as the amount of data processed continues to grow, demands by businesses, especially financial institutions such as banks, for on-line, backup capabilities are increasing.

[Problems to be Solved by the Invention]

However, when to perform on-line backups a company having a data center in Tokyo establishes a backup point in Fukui, for example, a heavy traffic load would be imposed only across a network extending from Tokyo to Fukui, i.e., between the data center and the backup point.

SUMMARY

It is, therefore, one object of the present invention to provide a backup management device that can resolve the problem, a backup management method and a backup system and a program therefor and a recording medium for storing the program. This object is achieved by combining the characteristics described in the independent claims of this invention, while the dependent claims further define effective, specific examples for this invention.

[Means for Solving the Problems]

More specifically, according to a first aspect of the present invention, a backup management device, which to perform the backup of data transmits backup data from a backup source recording device across a network to at least one backup destination recording device, comprises:

a load calculation unit for obtaining a load distribution for said network;

a backup destination selector for employing load distribution to select, from among multiple available backup destinations, at least one backup destination recording device to which data is to be transmitted; and a data transmitter for transmitting data to at least one backup destination recording device that is selected by said backup destination selector. Further provided are a backup management method and a backup system, a control program therefor and a recording medium for storing the program.

According to a second aspect of the invention, a backup management device, which to backup data transmits backup data from a backup source recording device across a network to at least one backup destination recording device, comprises:

a backup destination selector for employing the characteristics of multiple available backup destinations to select at least one backup destination recording device to which backup data should be transmitted; and a data transmitter for transmitting the backup data to the backup destination recording device selected by the backup destination selector. Further provided are a backup management method and a backup system and a control program therefor, and a recording medium for storing the program.

BRIEF DESCRIPTION OF THE DRAWINGS

FIG. 2 is a diagram showing an example functional configuration for a backup management device 100a.

FIG. 3 is a diagram showing an example operation performed by the backup management device 100a.

FIG. 4 is a flowchart showing example processing performed by the backup management device 100a.

FIG. 5 is a diagram showing an example hardware configuration for the backup management device 100a.

DETAILED DESCRIPTION

[Preferred Embodiment of the Invention]

The present invention will now be described while referring to one embodiment.

The present invention, however, is not limited to this embodiment, and to achieve the present invention, not all the combinations of characteristics described in the embodiment are required.

Figure 1:
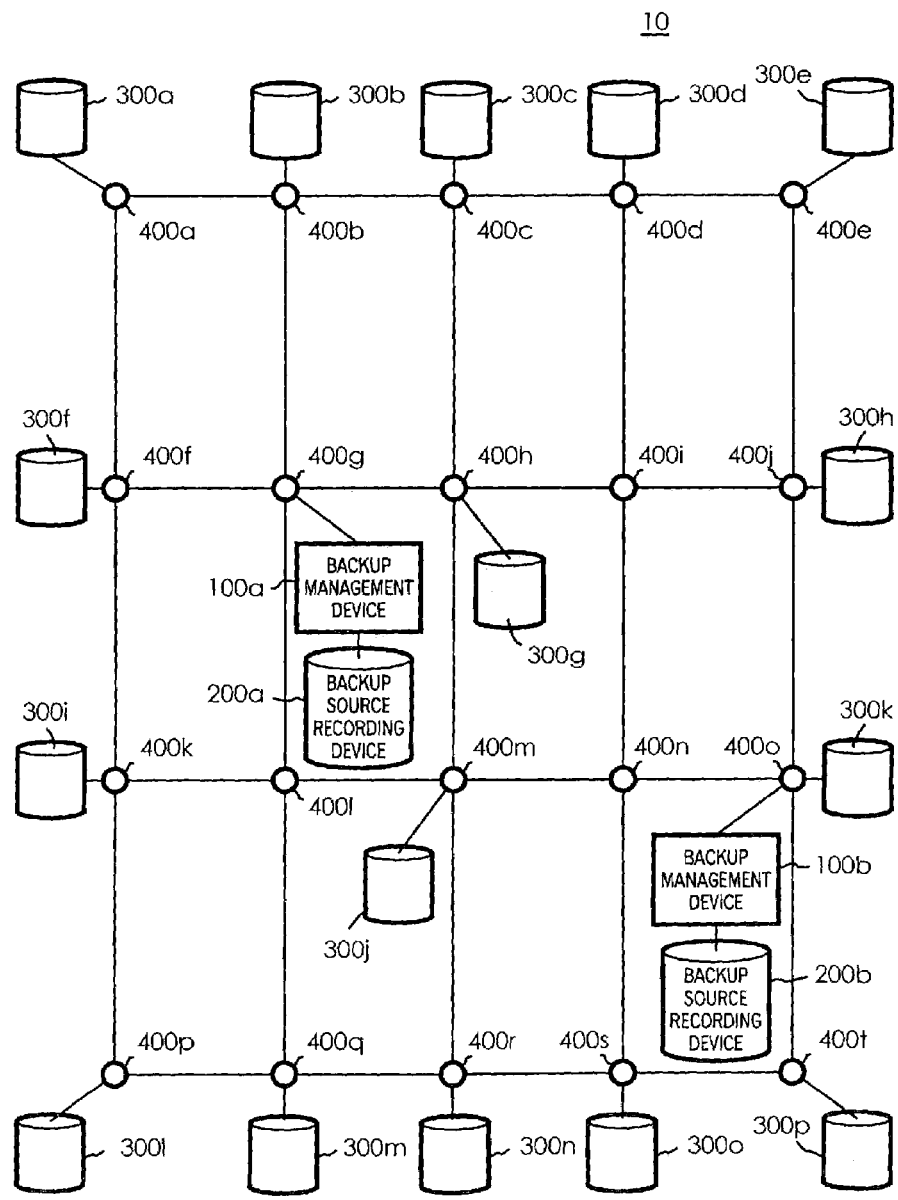
FIG. 1 is a diagram showing an example configuration for a backup system 10.

FIG. 1 is a diagram showing an example configuration of a backup system 10 according to one embodiment of the invention. The backup system 10 comprises: backup source recording devices 200a and 200b, which store data for backups; multiple backup destination recording devices 300a to 300p, which during a backup store data initially stored in the backup source recording devices 200a and 200b; backup management devices 100a and 100b, which are respectively connected to the backup source recording devices 200a and 200b and which, to backup data, transmit data stored in the backup source recording devices 200a and 200b to the multiple backup destination recording devices 300a to 300p; and multiple routers 400a to 400t, which connect the backup management devices 100a and 100b to the backup destination recording devices 300a to 300p. Since the backup management devices 100a and 100b have the same configuration, the configuration and the operation of only the backup management device 100a will be described.

Under a predetermined condition, the backup management device 100a selects at least one of the backup destination recording devices 300a to 300p for the backup of data, and transmits data stored in the backup source recording device 200a to the selected backup destination recording device. Then, when due to a disaster, etc., a data loss occurs at the backup source recording device 200a, the backup management device 100a recovers the data held by the backup source recording device 200a by obtaining from the backup destination recording device, backup data corresponding to the lost data.

The backup management device 100a may redundantly transmit data to multiple backup destination recording devices. For example, a RAID (a Redundant Array of Independent Disks) may be composed of multiple backup destination recording devices.

It is preferable that the backup destination recording devices 300a to 300p, available backup destinations, be distributed across a wide area, and that at least one of these backup destination recording devices 300a to 300p be separated from the backup management device 100a by a predetermined distance. Further, the backup system 10 may be set up by using a mesh-shaped network, or, as another example, a tree-shaped network. In addition, the system 10 may employ an arbitrary network such as the Internet.

According to the backup system 10 of this embodiment, multiple backup destination recording devices 300a to 300p are provided, and for a backup, data stored in the backup source recording device 200a are transmitted to at least one of the backup destination recording devices. Thus, during the backup of data the load imposed on a network is evenly distributed.

Figure 2:
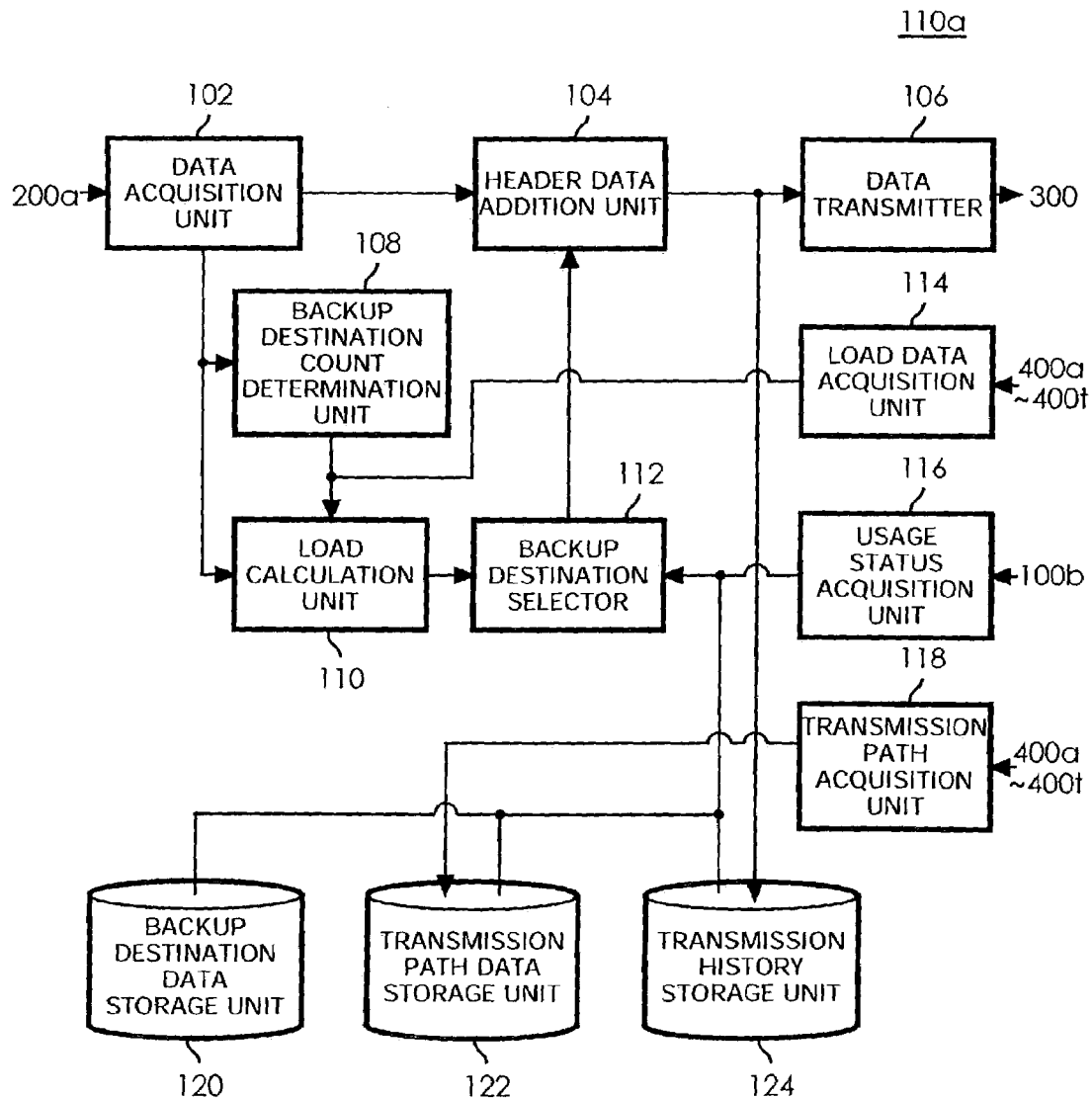

FIG. 2 is a diagram showing an example functional configuration for the backup management device 100a. The backup management device 100a includes: a data acquisition unit 102 for obtaining data from the backup source recording device 200a; a backup destination count determination unit 108 for employing the size of the data obtained by the data acquisition unit 102 to determine the number of backup destination recording devices to which data is to be transmitted; a load calculation unit 110 for calculating the load imposed on the network of the backup system 10; a backup destination selector 112 for employing the load distribution for the network, obtained by the load calculation unit 110, to select from among multiple available backup destinations, the backup destination recording devices 300a to 300p, at least one backup destination recording device to which data is to be transmitted; a header data addition unit 104 for the addition to the data of header data, such as address data for the backup destination recording device selected by the backup destination selector 112; and a data transmitter 106 for transmitting the data to the backup destination recording device selected by the backup destination selector 112.

The backup management device 100a further includes: a load data acquisition unit 114 for obtaining load data imposed on a network by the routers 400a to 400t; a usage status acquisition unit 116 for obtaining, from the backup management device 100b, usage status data indicating the usage statuses where the backup management device 100b employs the backup destination recording devices 300a to 300p; a transmission path acquisition unit 118 for obtaining, from the routers 400a to 400t, the transmission path data indicating the transmission paths leading from the backup source recording device 200a to the backup destination recording devices 300a to 300p; a backup destination data storage unit 120 for storing the characteristics of the backup destination recording devices 300a to 300p; a transmission path storage unit 122 for storing, for each backup destination recording device, the transmission path data obtained by the transmission path acquisition unit 118; and a transmission history storage unit 124 for storing the history data for the backup destination recording devices to which the data transmitter 106 previously transmitted data.

The load calculation unit 110 may employ the network load occurring during the transmission of data by the data transmitter 106 to obtain a load distribution imposed on the network of the backup system 10. Further, the load calculation unit 110 may also employ the network load data obtained by the load data acquisition unit 114 to obtain the network load distribution. That is, when data are transmitted to the backup destination recording devices 300a to 300p, the load calculation unit 110 may employ, as a load, the data transfer rate and the line usage rate at the individual sections of the network to obtain the network load distribution.

Based on the characteristics of the backup destination recording devices 300a to 300p stored in the backup destination data storage unit 120, the backup destination selector 112 may select a backup destination recording device to which data should be transmitted. For example, the backup destination selector 112 may select a backup destination recording device having a large free memory space, or a backup destination recording device having a high data transfer speed.

The backup destination selector 112 may employ the transmission path data stored in the transmission path data storage unit 122 to select a backup destination recording device to which data should be transmitted. For example, the backup destination selector 112 may select a backup destination recording device so that the delay time across the transmission path, occurring when the data transmitter 106 transmits data, is equal to or shorter than the length of a predetermined period.

Further, the backup destination selector 112 may refer to the transmission path data stored in the transmission path data storage unit 122, and may employ the number of hops from the backup source recording device 200a to the backup destination recording device to select a backup destination recording device to which data should be transmitted. For example, the backup destination selector 112 may select a backup destination recording device for which the number of hops to the backup source recording device 200a is small.

Also, the backup destination selector 112 may employ the history data stored in the transmission history storage unit 124 to select a backup destination recording device to which data should be transmitted. For example, the backup destination selector 112 may select a backup destination recording device used when a backup was performed for data having the same file name, or it may select a backup destination recording device to which data having a large size have not yet been transmitted.

The backup destination selector 112 may also employ the geographical conditions of the locations of the backup destination recording devices 300a to 300p to select a backup destination recording device to which data should be transmitted. For example, the backup destination selector 112 may select a backup destination recording device located in an area where disasters, such as earthquakes, or wind or flood damage, seldom occur.

Furthermore, the backup destination selector 112 may employ the distance between the backup source recording device 200a and each of the backup destination recording devices 300a to 300p to select a backup destination recording device to which data should be transmitted. For example, the backup destination selector 112 may select a backup destination recording device located at least at a predetermined distance from the backup source recording device 200a, or it may select a backup destination recording device located farther from the backup source recording device 200a.

Moreover, the backup destination selector 112 may employ usage status data obtained by the usage status acquisition unit 116 to select a backup destination recording device to which data should be transmitted. For example, the usage status acquisition unit 116 may obtain, as usage status data, data describing the network load distribution of the backup system 10 for the data that is transmitted by the backup management apparatus 100b to the backup destination recording device. The backup destination selector 112 may employ the network load distribution for the data transmitted by the backup management device 100b to select a backup destination recording device to which data should be transmitted.

The transmission path acquisition unit 118 may also dynamically obtain transmission path data from the routers 400a to 400t by using a protocol, such as the GGP (Gateway to Gateway Protocol), the EGP (Exterior Gateway Protocol) or the BGP (Border Gateway Protocol).

According to this embodiment, since the backup management device 100*a* employs the network load distribution for the backup system 10 when selecting a backup destination recording device, the network load distribution can be performed uniformly, and an increase in the delay time during the transmission of data can be prevented. Further, since a backup destination recording device is selected based on the usage statuses for the locations whereat the backup destination recording devices 300*a* to 300*p* are employed by the backup management device 100*b*, a more uniform network load distribution is possible.

Further, according to this embodiment, since the backup management device 100*a* selects a backup destination recording device located at a distance that is equal to or greater than a predetermined one, the loss of data due to the same disaster at the backup source recording device 100*a* and at the backup destination recording device can be prevented. Furthermore, since a backup destination recording device is selected based on the free space thereof, the failure of a backup due to a shortage of free space at a selected backup destination recording device can be prevented.

Figure 3:
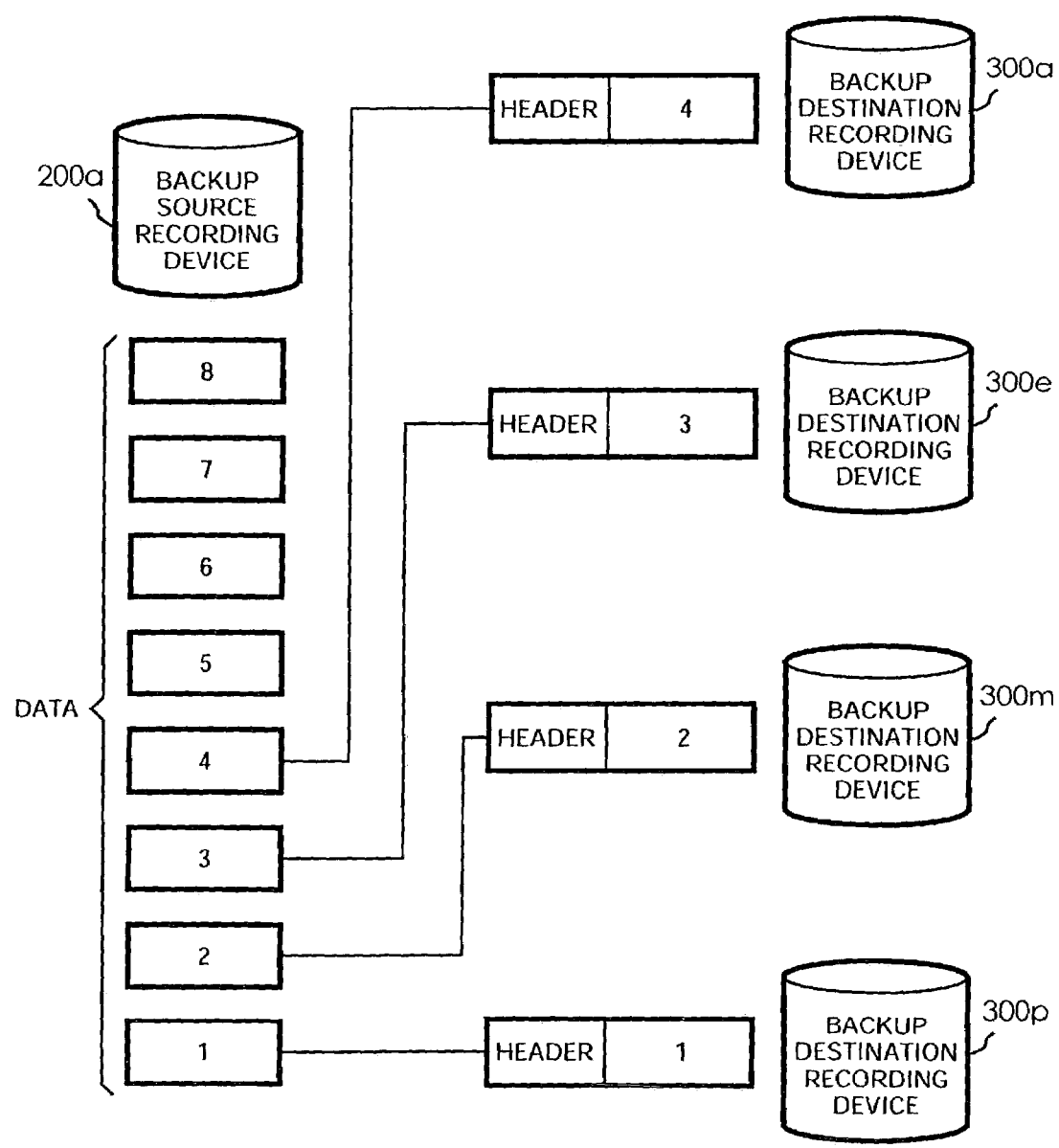

An example operation of the backup management device 100*a* is shown in FIG. 3. In this example, the backup destination count determination unit 108 determines that the number of available backup destination recording devices is four, and the backup destination selector 112 selects the backup destination recording devices 300*a*, 300*e*, 300*m* and 300*p*.

When the backup destination selector 112 selects multiple backup destination recording devices, the data transmitter 106 divides the data into segments and transmits the segments to the backup destination recording devices selected by the backup destination selector 112.

Specifically, the backup management device 100*a* performs the backup of data for each disk volume, for example. The backup destination selector 112 unconditionally allocates block numbers 1 to 8 for the backup destination recording devices. The header data addition unit 104 adds address data, such as IP addresses, to the data segments, and then, based on the address data, the data transmitter 106 transmits the data to the backup recording devices 300*a*, 300*e*, 300*m* and 300*p*.

The data transmitter 106 transmits, in correlation with the data segments, data for identifying the backup source recording device 200*a* and the locations of the data stored in the backup source recording devices. Specifically, the header data addition unit 104 adds to the data segments as header data that includes the IP address of the backup management device 100*a*, or the backup source recording device 200*a*, data for identifying the disk volume, and data for identifying a block number. Therefore, when due to a disaster data have been lost at the backup source recording device 200*a*, the data lost at the backup source recording device 200*a* can be recovered based on the header data provided for the lost data.

Figure 4:
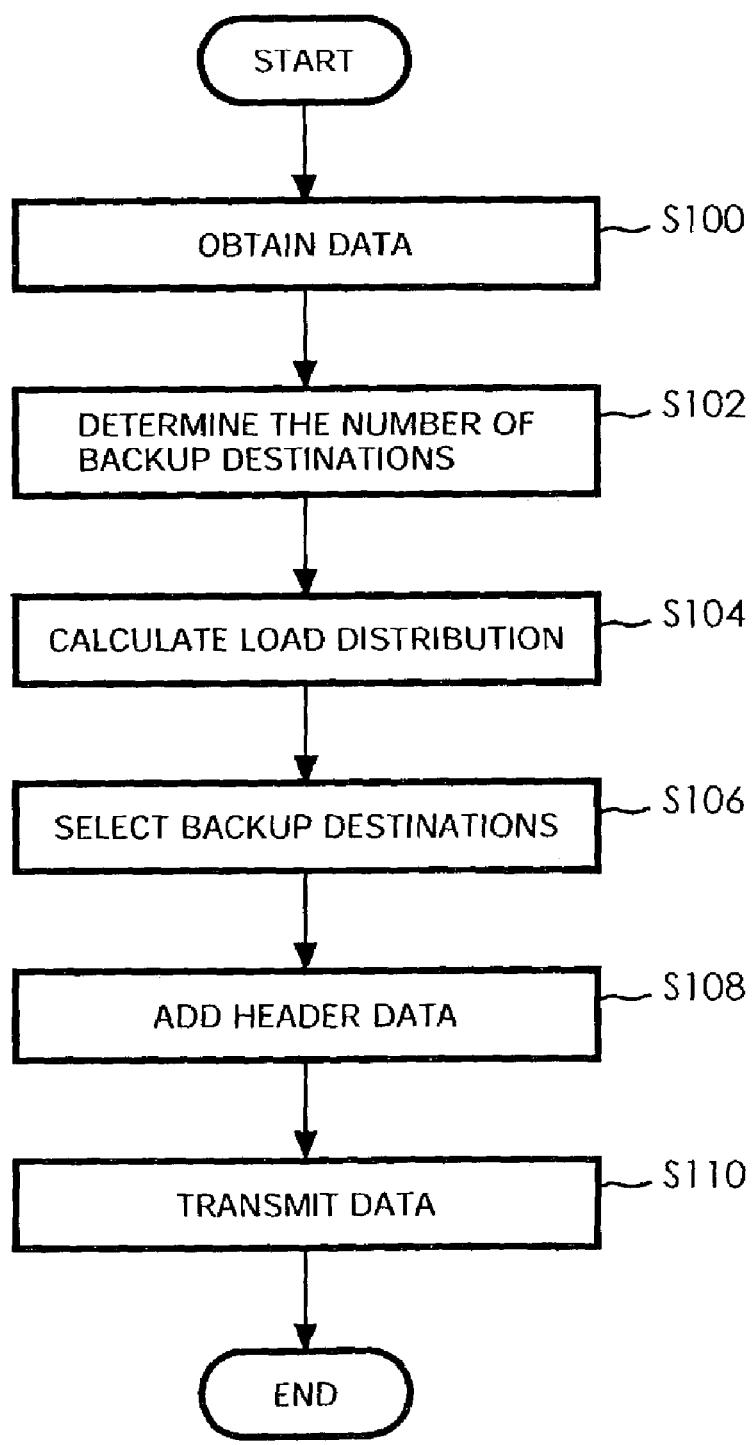

FIG. 4 is a flowchart for an example operation performed by the backup management device 100*a*. First, the data acquisition unit 102 obtains, from the backup source recording device 200*a*, target data for the backup (S100). Then, the obtained data and other data are employed to exclude, from among the multiple backup destination recording devices 300*a* to 300*p*, inappropriate backup destinations, and to define the remaining recording devices as available backup destinations. As inappropriate backup destination choices, the data acquisition unit 102 excludes, for example, a backup destination recording device that is currently halted for maintenance and a backup destination recording device that can not be accessed because the communication path is currently disconnected. Further, while taking into account the possibility of data loss due to a disaster, a backup destination recording device located too near the backup source recording device should also be excluded. Backup destination recording devices to be excluded can be determined based on the data stored in the backup destination data storage unit 120.

Next, the backup destination count determination unit 108 employs the size of the data obtained by the data acquisition unit 102 to determine the number of backup destination recording devices to which data should be transmitted (S102). This number can be determined by using N=ZU/T, for example. In this case, Z denotes the amount of data output by the backup management device 100*a* to the network during one unit hour; U denotes the number of users employing the backup system 10; and T denotes a smaller value, between the amount of data processed by one backup destination recording device during one unit hour and the minimum throughput value of each link that constitutes the network. Then, when an integer is not obtained as the value N, any fraction obtained for N is counted as a whole number. And since a so-called worst case is assumed for the equation for N, a constant $\alpha$ (<1) may be multiplied by N, as needed. The load calculation unit 110 employs the data obtained by the data acquisition unit 102 and the load data obtained by the load data acquisition unit 114 to obtain the network load distribution for the backup system (S104).

Following this, the backup destination selector 112 employs the network load distribution obtained by the load calculation unit 110 to select, from among the available backup destinations, the number of backup destination recording devices that was determined by the backup destination count determination unit 108 (S106). This selection, for example, can be performed in the following manner. First, all of the combinations of N backup destination recording devices are extracted from among the backup destination recording devices selected in the above manner. Then, a combination is selected, so that during one unit hour a uniform number of packets can be transferred between the individual network links, and so that this number can be as small as possible. For example, for each combination, imposed load $E=N1^2+N2^2+\ldots+Nk^2$ is calculated, and a combination having a minimum value is selected. In this case, N1, N2, . . . and Nk are the packet densities of the individual links. For example, for the pair of backup destination recording devices 300*a* and 300*b* when N=2, main paths from the backup management device 100*a* through the router 400*g* to the respective backup destination recording devices 300*a* and 300*b* are 400*g* to 400*f* to 400*a* to 300*a*, and 400*g* to 400*b* to 300*b*. However, the calculation of the imposed load E is performed for all the available paths. And at this time, when the backup management device 100*b* is currently performing the backup, the packet densities Ni (i=1, 2, . . . , k) of the links between the routers for the backup management device 100*b* should also be taken into account. For example, when the link between the routers 400*a* and 400*f* is currently being employed by the backup management device 100*b*, the packet density of this link is a value obtained by adding together the packets transmitted by the backup management device 100*b* and the packets transmitted by the backup management device 100*a*.

Then, the header data addition unit 104 adds, to the data, header data that includes address data for the backup destination recording device and data that is required for data recovery (S108). Thereafter, the data transmitter 106 transmits the data and the header data added by the header data addition unit 104 (S110), and the operation of the backup management device 100a in this embodiment is then terminated.

Figure 5:
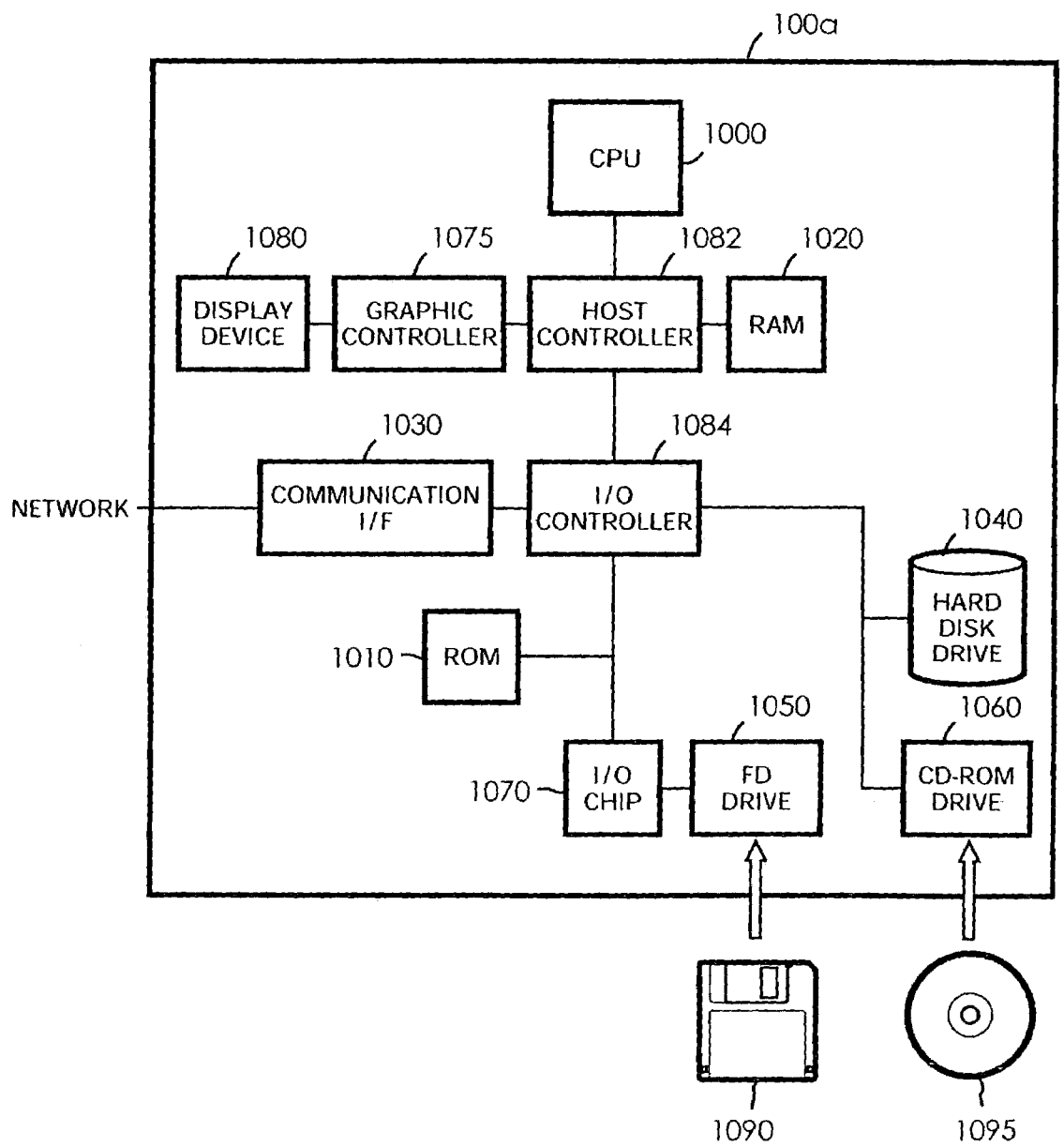

FIG. 5 is a diagram showing an example hardware configuration for the backup management device 100a. The backup management device 100a in this embodiment comprises: a CPU periphery section that includes a display device 1080, and a CPU 1000, a RAM 1020 and a graphic controller 1075, which are interconnected by a host controller 1082; an input/output section that includes a communication interface 1030, a hard disk drive 1040 and a CD-ROM drive 1060, which are connected to the host controller 1082 by an input/output controller 1084; and a legacy input/output section that includes a ROM 1010, a floppy disk drive 1050 and an input/output chip 1070, which are connected to the input/output controller 1084.

The host controller 1082 connects the RAM 1020 to the CPU 1000, which accesses the RAM 1020 at a high transfer rate, and the graphic controller 1075. The CPU 1000, the operation of which is based on programs stored in the ROM 1010 and the RAM 1020, controls the individual sections, while the graphic controller 1075 obtains image data that the CPU 1000, for example, generates in a frame buffer provided in the RAM 1020, and displays the image data on the display device 1080. Instead of this, however, the graphic controller 1075 may internally include a frame buffer for storing image data generated by the CPU 1000.

The input/output controller 1084 connects the host controller 1082 to the communication interface 1030, which is a comparatively fast input/output device, the hard disk drive 1040 and the CD-ROM drive 1060. The communication interface 1030 communicates with another device across a network, while the hard disk drive 1040 stores programs and data, used by the backup management device 100a, that the CD-ROM drive 1060 reads from a CD-ROM 1095 and transmits to the input/output chip 1070 through the RAM 1020.

The input/output controller 1084 also connects the ROM 1010 to comparatively slow input/output devices, such as the floppy disk drive 1050 and the input/output chip 1070. The ROM 1010 is used to store a boot program that the CPU 1000 executes as the backup management device 100a is activated, and a program that depends on the hardware of the backup management device 100a. The floppy disk drive 1050 reads a program or data from the floppy disk 1090, and transmits the program or data to the input/output chip 1070 through the RAM 1020. The input/output chip 1070 connects the floppy disk 1090 to the various input/output devices through a parallel port, a serial port, a keyboard port and a mouse port, for example. The input/output chip 1070 receives, from an input/output device, data entered by a user, and transmits the data to a program executed by the backup management device 100a.

A program that implements the functions of the backup management device 100a includes a data acquisition module, a header data addition module, a data transmission module, a backup destination determination module, a load calculation module, a backup destination selection module, a load data acquisition module, a usage data acquisition module, a transmission path acquisition module, a backup destination data storage module, a transmission path data storage module and a transmission history storage module. These modules are programs that, with the backup management device 100a, function as the data acquisition unit 102, the header data addition unit 104, the data transmitter 106, the backup destination determination unit 108, the load calculation unit 110, the backup destination selector 112, the load data acquisition unit 114, the usage data acquisition unit 116, the transmission path acquisition unit 118, the backup destination data storage unit 120, the transmission path data storage unit 122 and the transmission history storage unit 124.

The programs for the backup management device 100a are provided by a user, while being stored on a recording medium, such as the floppy disk 1090, the CD-ROM 1095 or an IC card. The programs are read from the recording medium and installed, through the input/output chip 1070, for the backup management device 100a, and are executed by the backup management device 100a.

The programs or the above modules may be stored on an external storage medium. This storage medium can not only be a floppy disk 1090 or a CD-ROM 1095, but can also be an optical recording medium such as a DVD or PD, a magneto-optical recording medium such as an MD, a tape medium or a semiconductor memory such as an IC card. In addition, a storage device, such as a hard disk or a RAM provided for a server system connected to a private communication network or the Internet, may be employed as a recording medium, and programs may be provided through the network.

The present invention has been explained by referring to the embodiment; however, the technical scope of the invention is not limited to that described in the embodiment. The embodiment can be variously modified or improved, and as is obvious from the claims for the invention, such a modification or improvement can be included within the technical scope of the invention.

According to this embodiment, the backup management device, the backup method, the backup system and the program therefor, and the recording medium that stores this program are implemented in the following Entries.

(Entry 1) A backup management device for transmitting data for a backup from a backup source recording device through a network to at least one backup destination recording device and for performing a backup comprising:

a load calculation unit for obtaining a load distribution for the network;

a backup destination selector for employing the load distribution to select, from among multiple available backup destinations, at least one backup destination recording device to which the data should be transmitted; and a data transmitter for transmitting the data to the backup destination recording device selected by the backup destination selector.

(Entry 2) A backup management device according to Entry 1, wherein the load calculation unit obtains the load distribution for the network based on the load imposed on the network by the transmission of the data that the data transmitter must transmit.

(Entry 3) A backup management device according to Entry 1, wherein the backup destination selector selects multiple backup destination recording devices; and wherein the data transmitter divides the data into data segments and transmits the data segment to each of the multiple backup destination recording devices selected by the backup destination selector.

(Entry 4) A backup management device according to Entry 3, further comprising:
a transmission path storage unit for storing, in terms of each available backup destinations, transmission paths extending from the backup source recording device to the available backup destinations,
wherein the backup destination selector selects the multiple backup destination recording devices so that, along the transmission path, the delay time resulting from the transmission of the data is equal to or less than a predetermined time.

(Entry 5) A backup management device according to Entry 1, further comprising:
a backup destination count determination unit for determining, based on the size of the data, the number of backup destination recording devices to which the data should be transmitted,
wherein the backup destination selector employs the load distribution to select the number, as determined by the backup destination count determination unit, of backup destination recording devices.

(Entry 6) A backup management device according to Entry 1, wherein the backup destination selector further employs characteristics of the available backup destinations to select, at the least, the backup destination recording device to which the data should be transmitted.

(Entry 7) A backup management device according to Entry 6, wherein the backup destination selector selects backup destination recording devices having large free memory spaces, which are the characteristics of the available backup destination.

(Entry 8) A backup management device according to Entry 1, wherein the backup destination selector selects backup destination recording devices located at distances from the backup source recording device that are equal to or greater than a predetermined distance.

(Entry 9) A backup management device according to Entry 1, wherein the backup destination selector further employs, the geographical conditions of the locations of the available backup destinations when selecting at the least one backup destination recording device to which the data should be transmitted.

(Entry 10) A backup management device according to Entry 1, further comprising:
a transmission history storage unit for storing history data for the backup destination recording devices to which data has previously been transmitted by the data transmitter,
wherein the backup destination selector employs, the transmission history data when selecting at the least one backup destination recording device.

(Entry 11) A backup management device according to Entry 1, wherein the data transmitter transmits, in correlation with the data, data for identifying the backup source recording device and for locating the data stored in the backup source recording device.

(Entry 12) A backup management device, which to perform the backup of data transmits the data for the backup from a backup source recording device across a network to at least one backup destination recording device, comprising:
a backup destination selector for employing the characteristics of multiple available backup destinations to select at least one backup destination recording device to which the data should be transmitted; and
a data transmitter for transmitting the data to at least one backup destination recording device selected by the backup destination selector.

(Entry 13) A backup method for a backup management device, which to perform a backup transmits, across a network, data for the backup from a backup source recording device to at least one backup destination recording device, comprising:
a load calculation step of obtaining a load distribution for the network;
a backup destination selection step of employing the load distribution to select, from among multiple available backup destinations, at least one backup destination recording device to which the data should be transmitted; and
a data transmission step of transmitting the data to at least one backup destination recording device selected at the backup destination selection step.

(Entry 14) A backup method for a backup management device, which to perform a backup transmits, across a network, data for the backup from a backup source recording device to at least one backup destination recording device, comprising:
a backup destination selection step of employing the characteristics of multiple available backup destinations to select at least one backup destination recording device to which the data should be transmitted; and
a data transmission step of transmitting the data to at least one backup destination recording device selected at the backup destination selection step.

(Entry 15) A backup system comprising:
a first backup source recording device for storing first data for a backup;
multiple backup destination recording devices for storing the first data as backup data; and
a first backup management device for permitting the first backup source recording device to transmit the first data to at least one backup destination recording device,
wherein the first backup management device includes
a load calculation unit for obtaining a load distribution for a network,
a backup destination selector for employing the load distribution to select, from among multiple available backup destinations, at least one backup destination recording device to which the data should be transmitted, and
a data transmitter for transmitting the data to at least one backup destination recording device selected by the backup destination selector.

(Entry 16) A backup system according to Entry 15, further comprising:
a second backup source recording device for storing second data for a backup; and
a second backup management device for permitting the second backup source recording device to transmit the second data to at least one backup destination recording device,
wherein the first backup management device further includes
a usage status acquisition unit for obtaining usage status data indicating the usage status of the multiple backup destination recording devices that are employed by the second backup management device, and
wherein the backup destination selector employs the usage status data to select at least one backup destination recording device.

(Entry 17) A backup system according to Entry 16, wherein the usage status acquisition unit obtains, as the usage status data, data indicating a load distribution of the network for the second data that is transmitted from the second backup source recording device to the multiple backup destination recording devices.

(Entry 18) A program for a backup management device, which transmits, across a network, data for a backup from a backup source recording device to at least one backup destination recording device and which performs the backup, that permits the backup management device to function as:

a load calculation unit for obtaining a load distribution for the network;

a backup destination selector for employing the load distribution to select, from among multiple available backup destinations, at least one backup destination recording device to which the data should be transmitted; and a data transmitter for transmitting the data to at least one backup destination recording device selected by the backup destination selector.

(Entry 19) A recording medium for storing a program for a backup management device, which transmits, across a network, data for a backup from a backup source recording device to at least one backup destination recording device and which performs the backup, wherein the program permits the backup management device to function as:

a load calculation unit for obtaining a load distribution for the network;

a backup destination selector for employing the load distribution to select, from among multiple available backup destinations, at least one backup destination recording device to which the data should be transmitted; and a data transmitter for transmitting the data to at least one backup destination recording device selected by the backup destination selector.

[Advantages of the Invention]

As is apparent from this explanation, according to the present invention, a backup management device can be provided that can efficiently perform a data backup at a remote area by dispersing the load imposed on a network.

What is claimed is:

1. A backup management device for transmitting data across a network from a backup source recording device to at least one backup destination recording device, the backup management device comprising:

a backup destination count determination unit configured to determine, based on a size of the data, a number N of backup destination recording devices, wherein $N=ZU/T$ rounded up to an integer value, wherein Z denotes an amount of data output by the backup management device to the network during a unit hour, U denotes a number of users employing the backup management device, and T denotes a value between an amount of data processed by one backup destination recording device during a unit hour and a minimum throughput value of links of the network;

a backup destination selector coupled to the backup destination count determination unit, wherein the backup destination selector is configured to:

employ characteristics of multiple available backup destination recording devices to extract combinations of N backup destination recording devices from a plurality of backup destination recording devices;

calculate an imposed load $E=N1^2+N2^2+\ldots+Nk^2$, for each extracted combination of N backup destination recording devices; and a data transmitter configured to transmit the data to the N backup destination recording devices selected by the backup destination selector, wherein the data transmitter is coupled to the backup destination selector.

2. A backup management device for transmitting data for a backup from a backup source recording device through a network to at least one backup destination recording device, the backup management device comprising:

a load calculation unit configured to obtain a load distribution for the network;

a backup destination count determination unit coupled to the load calculation unit, wherein the backup destination count determination unit is configured to determine a number N of backup destination recording devices to be selected from a plurality of backup destination recording devices wherein $N=ZU/T$ rounded up to an integer value, wherein Z denotes an amount of data output by the backup management device to the network during a unit hour, U denotes a number of users employing the backup management device, and T denotes a value between an amount of data processed by one backup destination recording device during a unit hour and a minimum throughput value of links of the network;

a backup destination selector configured to:

extract combinations of N backup destination recording devices from the plurality of backup destination recording devices;

calculate an imposed load $E=N1^2+N2^2+\ldots+Nk^2$, for each extracted combination of N backup destination recording devices; and select, from the extracted combinations of N backup destination recording devices, a combination of N destination recording devices that has a minimum imposed load E;

a data transmitter configured to transmit the data to the N backup destination recording devices selected by the backup destination selector;

and wherein the backup destination selector is coupled to the load calculation unit and the data transmitter.

3. The backup management device according to claim 2, wherein the load calculation unit obtains the load distribution for the network based on the toad imposed on the network byte transmission of the data that the data transmitter must transmit for the backup.

4. The backup management device according to claim 2, wherein the data transmitter is configured to divide the data into data segments and to transmit the data segments to each of the N backup destination recording devices selected by the backup destination selector.

5. The backup management device according to claim 4, further comprising:

a transmission path storage unit configured to store, for each available backup destination, transmission paths extending from the backup source recording device to the available backup destinations, wherein the transmission path storage unit is coupled to the backup destination selector;

and wherein the backup destination selector is configured to select the at least one backup destination recording device so that, along the transmission path, the delay time is minimized.

6. The backup management device according to claim 1, wherein the backup destination selector is further configured to perform the following operations:
  select, from the extracted combinations of N backup destination recording devices, a combination of N destination recording devices that has a minimum imposed load E.

7. The backup management device according to claim 1, wherein the backup destination selector is further configured to employ the number of hops from the backup source recording device to each of the multiple available destination recording devices to select the N backup destination recording devices.

8. The backup management device according to claim 2, wherein the backup, destination selector is further configured to employ characteristics of the plurality of backup destination recording devices to select the N backup destination recording devices, and wherein each of the N destination recording devices selected by the backup destination selector have large free memory space, and wherein having large free memory space is one of the characteristics of the plurality of backup destination recording devices.

9. The backup management device according to claim 2, wherein each of the N backup destination recording devices selected by the backup destination selector are located at distances from the backup source recording device that are equal to or greater than a predetermined distance.

10. The backup management device according to claim 2, further comprising:
  a transmission history storage unit configured to store history data concerning the backup destination recording devices to which data has previously been transmitted by the data transmitter, wherein the transmission history storage unit is coupled to the backup destination selector;
  and wherein the backup destination selector is configured to employ the transmission history data when selecting the N backup destination recording devices.

11. The backup management device according to claim 2, wherein the data transmitter is configured to transmit, in correlation with the data, header data for identifying the backup source recording device and for locating the data stored in the backup source recording device.

12. A method for backing up data over a network, the method comprising the following operations:
  obtaining a load distribution for the network;
  extracting combinations of N backup destination recording devices from a plurality of backup destination recording devices, wherein N=ZU/T rounded up to an integer value, wherein Z denotes an amount of data output by a backup management device to the network during a unit hour, U denotes a number of users employing the backup management device, and T denotes a value between an amount of data processed by a backup destination recording device in the plurality of backup destination recording devices during a unit hour and a minimum throughput value of links of the network;
  calculating an imposed load E=N12+N22+ . . . +Nk2, for each extracted combination of N backup destination recording devices;
  selecting, from the extracted combinations of N backup destination recording devices, a combination of N destination recording devices that has a minimum imposed load E; and transmitting the data from a backup source recording device over the network to the N backup destination recording devices selected.

13. A method for backing up data over a network, the method comprising the following operations:
  extracting combinations of N backup destination recording devices from a plurality of backup destination recording devices, wherein N=ZU/T rounded up to a whole number, wherein Z denotes an amount of data output by a backup management device to the network during a unit hour, U denotes a number of users employing the backup management device, and T denotes a value between an amount of data processed by a backup destination recording device during a unit hour and a minimum throughput value of links of the network;
  calculating an imposed load E=N12+N22+ . . . +Nk2, for each extracted combination of N backup destination recording devices;
  selecting, from the extracted combinations of N backup destination recording devices, a combination of N destination recording devices that has a minimum imposed load E.

14. A backup system, comprising:
  a first backup source recording device for storing first data for a backup;
  a plurality of backup destination recording devices; and
  a first backup management device configured to permit the first backup source recording device to transmit the first data to N backup destination recording devices in the plurality of backup destination recording devices, wherein N=ZU/T rounded up to a whole number, wherein Z denotes an amount of data output by the first backup management device to a network during a unit hour, U denotes a number of users employing the backup management device, and T denotes a value between an amount of data processed by one of the backup destination recording devices during a unit hour and a minimum throughout value of links of the network;
  wherein the first backup management device includes:
    a load calculation unit configured to obtain a load distribution for the network,
    a backup destination selector configured to:
      extract combinations of N backup destination recording devices from the plurality of backup destination recording devices;
      calculate an imposed load E=N12+N22+ . . . +Nk2, for each extracted combination of N backup destination recording devices; and
      select, from the extracted combinations of N backup destination recording devices, a combination of N destination recording devices that has a minimum imposed load E; and
    a data transmitter configured to transmit the data to the N backup destination recording devices selected by the backup destination selector.

15. The backup system according to claim 14, further comprising:
  a second backup source recording device for storing second data for a backup; and
  a second backup management device configured to permit the second backup source recording device to transmit the second data to at least one backup destination recording device in the plurality of backup destination recording devices,
  wherein the first backup management device further includes:
    a usage status acquisition unit configured to obtain usage status data indicating the usage status of the at least one backup destination recording devices that are employed by the second backup management device;

and wherein the backup destination selector is further configured to employ the usage status data to select the N backup destination recording devices to which the data should be transmitted by the first backup management device.

16. The backup system according to claim 15, wherein the usage status acquisition unit is configured to obtain, as the usage status data, data indicating a load distribution of the network for the second data that is transmitted from the second backup source recording device to the at least one of the backup destination recording devices employed by the second backup management device.

17. A program embodied in a storage medium, for a backup management device that transmits data for a backup across a network from a backup source recording device to at least one backup destination recording device, wherein the program for the backup management device comprises:
 a load calculation unit configured to obtain a load distribution for the network;
 a backup destination selector configured to:
  extract combinations of N backup destination recording devices from a plurality of backup destination recording devices, wherein N=ZU/T rounded up to an integer value, wherein Z denotes an amount of data output by the backup management device to the network during a unit hour, U denotes a number of users employing the backup management device, and T denotes a value between an amount of data processed by one backup destination recording device during a unit hour and a minimum throughput value of links of the network;
  calculate an imposed load $E=N1^2+N2^2+ \ldots +Nk^2$, for each extracted combination of N backup destination recording devices; and
  select, from the extracted combinations of N backup destination recording devices, a combination of N destination recording devices that has a minimum imposed load E; and
 a data transmitter configured to transmit the data to the N backup destination recording devices selected by the backup destination selector.

18. A device for backing up data over a network, comprising:
 means for obtaining a load distribution for the network;
 means for extracting combinations of N backup destination recording devices from a plurality of backup destination recording devices, wherein N=ZU/T rounded up to an integer value, wherein Z denotes an amount of data output by a backup management device to the network during a unit hour, U denotes a number of users employing the backup management device, and T denotes a value between an amount of data processed by one of the backup destination recording devices during a unit hour and a minimum throughput value of links of the network;
 means for calculating an imposed load $E=N1^2+N2^2+ \ldots +Nk^2$, for each extracted combination of N backup destination recording devices;
 means for selecting, from the extracted combinations of N backup destination recording devices, a combination of N destination recording devices that has a minimum imposed load E; and
 means for transmitting the data from a backup source recording device over the network to the N selected destination recording devices.

19. A backup device, comprising:
 means for calculating N=ZU/T rounded up to a whole number, wherein Z denotes an amount of data output by a backup management device to a network during a unit hour, U denotes a number of users employing the backup management device, and T denotes a value between an amount of data processed by a backup destination recording device during a unit hour and a minimum throughput value of links of the network;
 means for extracting combinations of N backup destination recording devices from a plurality of backup destination recording devices;
 means for calculating an imposed load $E=N1^2+N2^2+ \ldots +Nk^2$, for each extracted combination of N backup destination recording devices;
 means for selecting, from the extracted combinations of N backup destination recording devices, a combination of N destination recording devices that has a minimum imposed load E;
 means for adding header data to data segments, wherein the header data includes an IP address of a source recording device, and data for identifying a disk volume; and
 means for transmitting the data segments from a backup source recording device.

* * * * *